Figure 1:
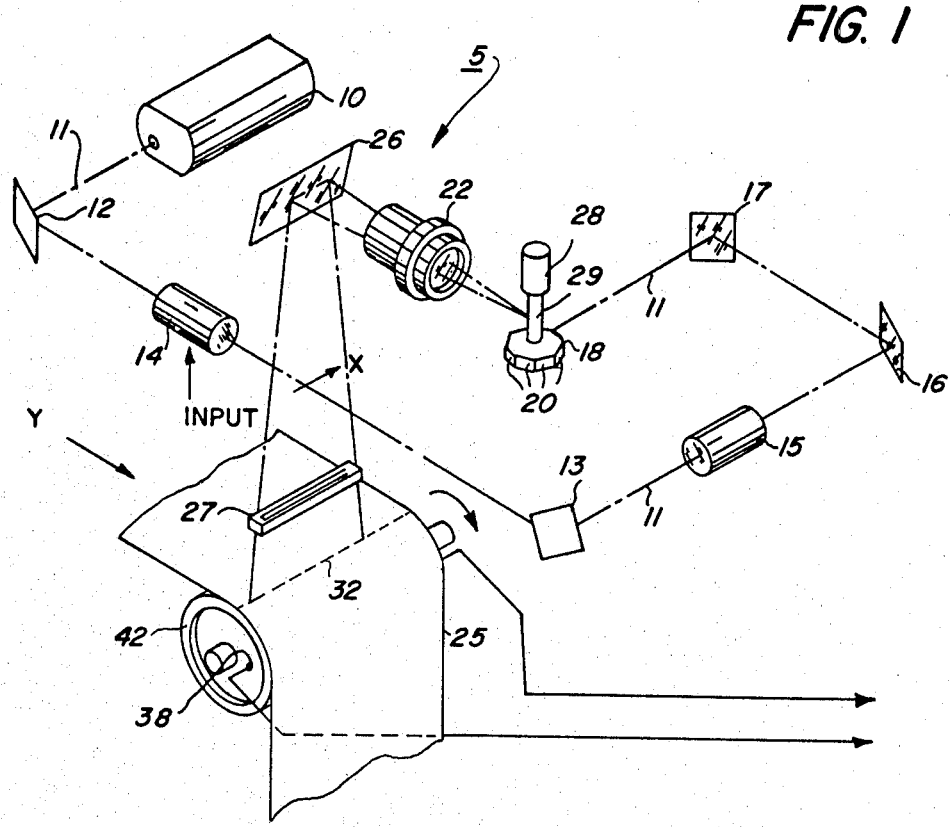

United States Patent [19]

Traino

[11] 4,349,847
[45] Sep. 14, 1982

[54] IMAGE SIZE CONTROL FOR RASTER SCANNERS

[75] Inventor: James C. Traino, Fairport, N.Y.

[73] Assignee: Xerox Corporation, Stamford, Conn.

[21] Appl. No.: 229,811

[22] Filed: Jan. 30, 1981

[51] Int. Cl.$^3$ ............................................... H04N 1/12
[52] U.S. Cl. .................................. 358/293; 358/264; 358/267
[58] Field of Search .............. 358/264, 267, 285, 287, 358/288, 293; 350/6.8, 285

[56] References Cited

U.S. PATENT DOCUMENTS

| | | | |
|---|---|---|---|
| 3,835,249 | 9/1974 | Dattilo et al. | 358/285 |
| 3,848,087 | 11/1974 | Carrell | 358/264 |
| 3,975,761 | 8/1976 | Taudt et al. | 358/78 |
| 4,000,368 | 12/1976 | Tisue | 358/264 |
| 4,002,829 | 1/1977 | Hutchison | 358/293 |
| 4,028,732 | 6/1977 | Salter et al. | 358/289 |
| 4,130,838 | 12/1978 | St. John | 358/267 |
| 4,180,822 | 12/1979 | Hudson | 358/293 |
| 4,268,867 | 5/1981 | Traino | 358/293 |

Primary Examiner—Howard Britton
Attorney, Agent, or Firm—Frederick E. McMullen

[57] ABSTRACT

A raster output scanner having a movable imaging member and high intensity imaging beam for exposing the imaging member to create images thereon. A rotating polygon scans the beam across the imaging member in line by line fashion while a modulator astride the beam path modulates the beam in accordance with image signals or pixels input thereto. A clock provides clock pulses for clocking the image pixels to the modulator.

To assure uniform image size despite variations in the velocity of the imaging member, a control signal representative of imaging member velocity is used to control polygon velocity and maintain a predetermined velocity relationship between imaging member and polygon. Means are provided to servo clock frequency with polygon rotation, with a control to shift the clock servo midpoint frequency in response to changes in imaging member velocity.

9 Claims, 2 Drawing Figures

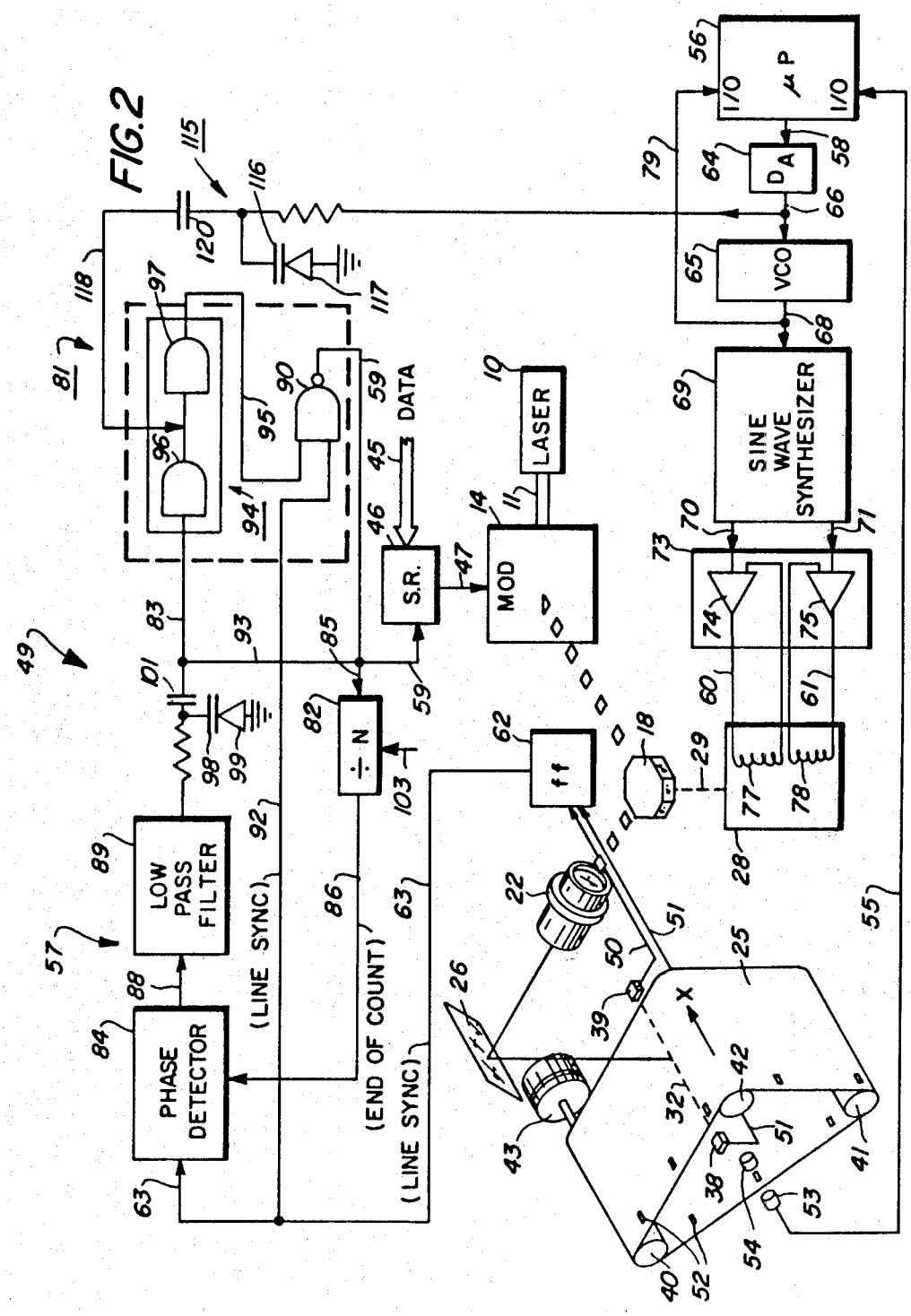

IMAGE SIZE CONTROL FOR RASTER SCANNERS

This invention relates to raster output scanners, and more particularly to apparatus and method for maintaining constant image size despite variations in the velocity of the member on which images are produced.

Raster output scanning systems typically consist of a scanner and xerographic apparatus, images being created through exposure of the previously charged xerographic apparatus photoconductive member by the scanner's scanning beam modulated in accordance with video image signals or pixels. Heretofore, to maintain image size uniform in the direction of movement of the photoconductive member, (i.e. the Y-direction) manual adjustment of the scanner has been required. For example, where a two-phase hysteresis synchronous motor was used to drive the scanning polygon and a quadrature oscillator to provide sine and cosine power waves to the motor, correlation between polygon velocity and photoconductive member velocity for constant image size could be achieved by the rather difficult and time consuming expediency of adjusting the oscillator's potentiometer while monitoring the distance between adjoining lines of a test document.

On the other hand, image size in the direction of scan (i.e. the X-direction) is known to be a function of image signal or pixel rate which in turn is determined by the image signal or pixel clock frequency. A clock with phase locked loop control may be for example, be used to generate pixel clock pulses at a frequency which is a function of polygon velocity, the phase locked loop monitoring variations in polygon velocity and adjusting clock frequency to maintain image size constant in the aforesaid beam scan direction.

However, the voltage controlled oscillators normally required in systems of this type have limited range and when the adjustment limit is exceeded which is often the case, manual adjustment to restore linear tracking of the polygon velocity is necessary. Again, this typically required the use of a special test document with measurements taken therefrom used as a basis for adjusting the pixel clock frequency.

While the foregoing arrangements for adjusting the scanner components to accommodate wear and assure uniform image size over the scanner lifetime may be used effectively, both require manual implementation and periodic institution. Because of the high degree of training and skill required, as well as the special tools and instruments needed, these procedures are relatively expensive and impose delays during which scanner operation must be curtailed.

The invention relates to a raster output scanner for producing images on a movable imaging member in response to image pixels input thereto comprising: a high intensity imaging beam; a movable scanning element for scanning the beam across the imaging member; a drive motor for driving the scanning element; modulator for modulating the beam to selectively expose the imaging member in accordance with image pixels input thereto; clock means for generating pixel clock pulses for clocking image pixels to the modulator means; sensor means for producing a pulse-like signal representative of the velocity of the imaging member; and control means responsive to the signal for adjusting the speed of the drive motor to change the velocity of the scanning element to thereby maintain a predetermined velocity relationship between the imaging member and the scanning element in spite of changes in the velocity of the imaging member during operation of the scanner.

The invention further relates to a method of providing constant image size in a raster scanner despite changes in velocity of the imaging member on which images are produced, the scanner including a high intensity imaging beam; a movable scan element for scanning the beam across the member; a drive motor for driving the scan element; modulator means for modulating the beam in accordance with image signals input thereto to generate an image representative of the image signals on the member; and clock means for generating clock pulses for clocking image signals to the modulator means, the steps comprising: generating a pulse-like signal representative of the velocity of the imaging member; and adjusting the speed of the drive motor in accordance with the signal to maintain a predetermined velocity relationship between the scan element and the imaging member despite changes in the velocity of the imaging member.

In the drawings:

FIG. 1 is an isometric view of an exemplary raster output scanner with which the present invention may be used; and FIG. 2 is a schematic view illustrating the control system of the present invention.

Referring to FIGS. 1 and 2, there is shown an exemplary raster output scanner 5 with which the present invention is adapted for use. Scanner 5 is provided with an illumination source, which in the exemplary arrangement shown comprises a laser 10 for generating a collimated beam 11 of monochromatic radiation. In the exemplary arrangement shown, beam 11 is modulated by modulator 14 in conformance with image information (DATA) contained in video image signals input thereto. Beam 11 is reflected by mirror 12 to modulator 14.

Modulator 14 may be any suitable electro optical modulator for imparting video information to beam 11. The modulator 14 may be for example, a Pockel's cell comprising a potassium dihydrogen phosphate crystal, whose index of refraction is periodically varied by the application of the varying voltage which represents the image signals. The image signals, which may impart information either by means of binary pulse code modulation or wideband frequency code modulation, represent discrete picture elements and are referred to as pixels herein.

It is understood that solid state diode lasers, which incorporate both light source and modulator in one unitary structure, may be used in place of the separate laser/modulator arrangement shown.

Downstream of modulator 14, the beam 11 is reflected by mirror 13 to an astigmatic lens configuration 15 which focuses the beam 11 to a controlled energy distribution, i.e. a spot onto at least one facet 20 of a suitable beam scanning element, illustrated herein by rotating polygon 18. Mirrors 16, 17 cooperate to direct the beam so that the beam impinges onto facets 20 of polygon 18.

In the preferred embodiment, the rotational axis of polygon 18 is orthogonal to the plane in which beam 11 travels. Facets 20 of polygon 18 are mirrored surfaces suitable for reflecting any radiated beam impinging thereon. Alternately, scanning may be effected by any other suitable device such as mirrored piezoelectric crystals, planar reflecting mirrors, and the like.

A lens 22 is located in the optical path between the polygon 18 and the imaging member which in the exemplary arrangement shown, comprises a photoconductive belt 25 of a xerographic reproduction or copying system (not shown). The lens 22 is of a diameter suitable to focus the beam reflected from facets 20 of the rotating polygon 18 to a spot in a focal plane proximate the surface of belt 25. Mirror 26 guides the beam 11 onto belt 25.

While the imaging member is shown herein as a photoconductive belt, other types of imaging members such as a drum, web, etc. may be contemplated.

Lens 22 provides a linear relationship between the rotating polygon 18 and the deflection of the spot in the traverse direction at the belt 25. This linearization by optical means prevents barrel or pincushion-type distortion effects without the need for electrical compensation.

Polygon 18 is preferably driven by a hysteresis synchronous motor 28 through drive shaft 29 with the rotational velocity or speed of polygon 18 synchronized with the velocity or speed of photoconductive belt 25, as will appear. Preferably, a cylindrical lens 27 is interposed between mirror 26 and belt 25 to compensate for any misalignment of the optical elements.

During operation of scanner 5, the rotating polygon 18 scans or sweeps the beam 11 across the photoconductive surface of belt 25 (in the X-direction shown in the drawings), beams 11 tracing a scan line 32 on the photoconductive surface of belt 25. Photodetectors 38, 39 provided adjacent the surface of belt 25 and astride the path of the scanning beam generate a pulse each time beam 11 sweeps across the photoconductive surface to establish Start of Scan (SOS) and End of Scan (EOS) signals respectively. As will be understood, the width of the SOS-EOS pulse generated by photodetectors 38, 39 (termed LINE SYNC herein) is dependent upon the velocity at which polygon 18 rotates. Variation in polygon velocity, due for example, to the hunting characteristics of motor 28, cause a change in the width of the LINE SYNC pulse generated by detectors 38, 39.

In the exemplary arrangement shown, photoconductive belt 25 is supported internally by rolls 40, 41, 42, roll 40 being drivingly coupled to a suitable belt drive motor 43. One or more timing marks 52, which may for example comprise holes, cutouts, transparent sections or the like are provided in belt 25, preferably along one edge thereof and outside the imaging area. A suitable sensor 53, such as a photodetector and cooperating light source 54 are suitable mounted on opposing sides of belt 25 opposite the path of movement of timing marks 52. As will be understood, a signal pulse is generated by sensor 53 each time a timing mark 52 passes between sensor 53 and light source 54. The train of signal pulses produced by sensor 53 are input to microprocessor 56 via lead 55.

As will be understood by those skilled in the xerographic arts, energization of belt drive motor 43 moves photoconductive belt 25 consecutively through a series of xerographic processing stations (not shown). These include a charging station whereat a uniform electrostatic charge is applied to the photoconductive surface of belt 25 and an exposure station where imaging beam 11 modulated by modulator 14 and scanned by rotating polygon 18, sweeps across the belt surface (in the X-direction) to selectively discharge the charged photoconductive surface in accordance with the content of the image pixels input to modulator 14. The latent electrostatic image formed on belt 25 thereafter passes through a developing station whereat the image is rendered visible by the application of toner. Following development, the developed image is carried on belt 25 to a transfer station where the developed image is transferred to a copy substrate material, typically a sheet of paper. A fusing device thereafter fixes the transferred image on the copy paper to provide a permanent copy.

Following transfer, the photoconductive surface of belt 25 is cleaned by a suitable cleaning device such as a rotating brush. The aforedescribed cycle is repeated for subsequent or additional copies.

Referring particularly to FIG. 2, image pixels (DATA) in the form of digital signals are provided through an 8 bit data bus 45 from a suitable source (not shown). In the example shown, bus 45 is coupled to parallel-in-serial out shift register 46, the serial output of shift register 46 being coupled to the input gate of modulator 14 through lead 47. Shift register 46 is driven by pixel clock pulses derived from clock 49 through lead 59.

The SOS and EOS pulses generated by photodetectors 38, 39 respectively are output through leads 50, 51, to flip flop 62. The LINE SYNC pulse output by flip flop 62 is fed through lead 63 to clock 49 to control the clock operating cycle, as will appear.

As will be understood, a predetermined velocity or speed relationship is required between the imaging member, here photoconductive belt 25, and the scanning element (i.e. polygon 18) if images of desired size and resolution are to be produced. Where this relationship is upset by a change in the velocity of photoconductive belt 25, image distortions may result since it is understood that the velocity of belt 25, which moves a direction (the Y-direction) normal to the direction of scanning beam 11 (the X-direction) is determinative of the spacing between successive scan lines. Heretofore, scanners of the aforedescribed type have suffered from an inability to compensate for variations in the velocity of the imaging member (i.e. belt 25) without manual intervention by a trained technician having specialized test and calibration equipment at his disposal. The present invention is intended to provide a control system which effectively maintains the aforementioned velocity relationship between imaging member and scanning element in cases where the velocity of the imaging member undergoes a change, without the need for manual correction or adjustment.

Referring to FIG. 2, the train of signal pulses output by sensor 53 is fed to Micro Processor (UP) 56, it being understood that the period or frequency of the signal pulse train generated by sensor 53 is determined by the speed or velocity of photoconductive belt 25. Micro Processor 56, which is programmed to generate a control signal proportional to the sensed velocity of belt 25, outputs a digital control signal in lead 58 to digital-to-analog (D/A) converter 64 which converts the digital control signal to an analog circuit signal.

A Voltage Controlled Oscillator (VCO) 65 provides the energizing source of polygon drive motor 28. The control signal output of D/A converter 64 is input to the frequency control gate of VCO 65 through lead 66, the control signal from D/A converter 64 serving to control the frequency of the motor energizing signal output of VCO 65. The signal output of VCO 65 is fed through lead 68 to a digital sine wave synthesizer 69 which serves to generate sine and cosine power waves in leads 70, 71 respectively. The sine and cosine waves output by synthesizer 69 are amplified by linear amplifiers 74, 75 of motor drive circuit 73, and coupled to the field windings 77, 78 of polygon drive motor 28 through motor leads 60, 61.

The signal output of VCO 65 is fed back to Micro Processor 56 via feedback lop 79. Micro processor 56 compares the frequency of the signal output of VCO 65, which represents polygon velocity, with desired polygon velocity as represented by the frequency of the signal pulses output by belt sensor 53. Where a difference exists, the level of the control signal output of Micro Processor 56 to VCO 65 is adjusted to change the frequency of the motor energizing signal output of VCO 65 to adjust polygn velocity and maintain the aforementioned velocity relationship between belt 25 and polygon 18.

During operation of scanner 5, belt drive motor 43 is energized to move photoconductive belt 25. At the same time, laser 10 and polygon drive motor 28 are energized, the latter serving to rotate polygon 18 and scan the beam 11 output by laser 10 across the previously charged surface of the moving photoconductive belt 25. Image pixels (DATA) are clocked into register 46 through data bus 45 by means of pixel clock signals generated by the clock 49, the image pixels being output from register 46 through lead 47 to modulator 14. As described, modulator 14 modulates the beam 11 in accordance with the content of the image pixels input thereto.

With movement of belt 25, sensor 53 generates a pulse-like signal as timing marks 52 on the photoconductive belt 25 move therepast, the frequency of the signal pulses generated by sensor 53 being proportional to the velocity of belt 25. The signal pulses output by belt sensor 53 are fed to Micro Processor 56 which in turn generates a control signal proportional to the velocity of belt 25. The digital control signal output of micro processor 56 is converted to an analog signal by D/A converter 64 and used to set the frequency of the motor energizing signal output of VCO 65. The signal output of VCO 65 is converted to sine and cosine wave form by synthesizer 69, amplified by motor drive circuit 73, and input to windings 77, 78 of polygon motor 28 to operate motor 28 and rotate polygon 18 as descried heretofore. Feedback loop 79 feeds back the motor energizing signals output of VCO 65 to Micro Processor 56 where the frequency of the motor signal is compared with the frequency of the signal pulses output by belt sensor 53, the latter representing the current velocity of photoconductive belt 25.

A change in the frequency of the signal pulses output by belt sensor 53, reflecting a change in the velocity of belt 25, results in a difference between the frequency of the motor energizing signals output by VCO 65 and the frequency of the signal pulses output by belt sensor 53. These results a corresponding change in the level of the control signal output of Micro Processor 56 to VCO 65 which changes the frequency setting of VCO 65. This results in a change in the frequency of the motor energizing signal output of VCO 65 with corresponding change in the speed of polygon drive motor 28 and polygon 18. The aforedescribed process continues until such time as the frequency of the motor energizing signal output of VCO 65 again equals the frequency of the signal pulses output by belt sensor 53, indicating desired synchronization between polygon and photoconductive belt velocities.

Referring to FIG. 2, clock 49 includes a highly stable Voltage Controlled Oscillator (VCO) 81 for generating pixel clock pulses, together with a servo control loop 57 for synchronizing the frequency of the pixel clock pulses output by VCO 81 with the scanning velocity of beam 11. VCO 81 has an inverting logic output gate 90 and input delay device 94, the later being comprised of a pair of series coupled non-inverting gates 96, 97. The output side of delay device 94 is coupled to one input of gate 90 through lead 95. Clock pulses output by gate 90 are fed via clock output lead 59 to shift register 46.

The LINE SYNC signal output of flip-flop 62, which serves to enable clock output gate 90, is coupled to one input of gate 90 through leads 63, 92. Clock return lead 93, which is coupled between clock output lead 59 and the input lead 83 to delay device 94, provides a clock feedback loop.

In operation of the clock 49, on the enabling signal (LINE SYNC) in lead 92 going high for example, the output of gate 90 to clock output lead 59, after a delay interval inherent in gate 90, goes low. The clock signal in lead 59 is fed back via lead 93 and clock input lead 83 to gate 96 of delay device 94. There the return signal is successively delayed by gates 96, 97, the length of which is dependent upon the internal characteristics of gates 96, 97. Following the aforementioned delay, the return signal in lead 95, after the delay characteristic of gate 90, triggers gate 90, causing the signal output of gate 90 to lead 59 to go high. The clock signal output to clock output lead 59 is fed back as described above and following a delay imposed by delay device 94 and gate 90, resets gate 90 to switch the signal output of gate 90 from high to low. As a result, the aforedescribed process generates in clock terminal output lead 59 a pulse-like signal or clock output which serves to clock image pixels to modulator 14.

At the end of the scan line as determined by EOS detector 39, the enabling signal (LINE SYNC) to gate 90 of VCO 81 goes low to terminate the output of pixel clock pulses to clock output lead 59.

Servo control loop 57 has a divide-by-N register 82 preset to a count representing the pixel clock frequency required to produce a desired image resolution. Pixel clock pulses output by VCO 81 to clock output lead 59 are input to register 82 through lead 85. The signal output of register 82, termed END OF COUNT, is fed through lead 86 to one input of phase detector 84. The LINE SYNC singal output of flip flop 62 is fed via lead 63 to a second input of phase detector 84. As will be understood, phase detector 84 produces a signal in output lead 88 thereof, with a strength proportional to the phase relationship between the LINE SYNC and, END OF COUNT signal pulses input thereto.

Output lead 88 of phase detector 84 is coupled through low pass filter 89 and blocking capacitor 101 to the input lead 83 of VCO 81. Filter 89 serves to filter out high frequency transients in the detector output while capacitor 101 provides D.C. blocking. A series coupled capacitor/diode 98, 99 are provided upstream of blocking capacitor 101 to permit voltage tuning of the frequency of VCO 81 through control over the rise and fall times of gate 90.

In operation, register 82 is preset to the current image resolution expressed for example in pixels per scan line by means of control lead 103. Pixel clock pulses generated by VCO 81 are input to register 82 where the pixel clock pulses are, in effect, compared with desired image resolution (i.e. the number of pixels in the scan line)

represented by the count to which register 82 is preset. On attaining coincidence, the END OF COUNT signal output by register 82 undergoes a change.

The END OF COUNT signal output of register 82 is fed to phase detector 84 where, in effect, the pulse width of the END OF COUNT signal is compared with the pulse width of the LINE SYNC signal generated by SOS and EOS detectors 38, 39 respectively. Where the signals (END OF COUNT and LINE SYNC) are in phse, the signal output of phase detector 84 is zero and no change in the frequency of the pixel clock signals output by VCO 81 occurs.

Should the scanning velocity of beam 11 change as for example, to accommodate a change in the velocity of photoconductive belt 25 as described heretofore, the pulse width of the LINE SYNC signal generated by SOS and EOS detectors 38, 39 respectively changes. In the case where the scanning velocity of beam 11 is increased in response to an increase in the velocity of photoconductive belt 25, the pulse width of the LINE SYNC signal decreases. Where the scanning velocity of beam 11 is decreased in accommodation of a decrease in belt velocity, the pulse width of the LINE SYNC signal increases.

On a change in the pulse width of the LINE SYNC signal, phase detector 84 generates a control signal having a potential proportional to the degree of change. The control signal changes the setting of capacitor/diode 98, 99 thereby causing either an increase or decrease in the output rise and fall times of clock output gate 90 depending on the control signal change. As a result, the frequency of the pixel clock signals output by VCO 81 is changed in accommodation of the change in beam scanning velocity.

Inasmuch as changes in the velocity of photoconductive belt 25 over a period may exceed the limits of adjustment of clock 49, a control circuit 115 is provided for automatically changing the center or mid-point frequency of pixel clock 49 in response to a change in the control signal output of Micro Processor 56. Control circuit 115 comprises a varactor type circuit having capacitor/diode pair 116, 117 respectively coupled between lead 118 and ground. Lead 118 is coupled between output lead 66 of D/A converter 64 and gate 96, 97 of delay device 94. Capacitor 120 in lead 118 provides D.C. blocking.

In operation, changes in the control signal output by micro processor 56 in response to changes in velocity of the photoconductive belt 25, changes the operating potential on delay device 94. As a result, the center or mid-point frequency of VCO 81, and hence clock 49, is shifted, the direction and degree of shift being dependent upon the change in control signal potential, which in turn reflects the change in photoconductive belt velocity.

As will be apparent to those skilled in the art, microprocessor 56 may be dispensed with and another control arrangement employed to control the velocity of scanning polygon 18 in accordance with changes in the velocity of photoconductive belt 25. For example, a servo loop control incorporating a divide-by-N circuit to reduce the frequency of the signal output of VCO 65 in feed back loop 79 and a phase detector for comparing the signal output of belt sensor 53 with the reduced frequency signal output of VCO 65 in feedback loop 79 and controlling the frequency of the signal output of VCO 65 in response thereto may instead be contemplated. As in the clock servo control loop 57 discussed above, a low pass filter may be provided in the phase detector output to remove high frequency transients.

It will further be understood that whatever the control arrangement employed, consideration may have to be given to initial or standing start conditions if start up and acceleration up to speed of photoconductive belt 25 are to be accommodated in cases where only a single or minimum number of timing marks 52 are provided on belt 25. It is appreciated that the fewer the number of timing marks on belt 25, the less representative the initial velocity signals generated by sensor 53 are and hence the more difficult to obtain an accurate representation of belt velocity at startup.

While the invention has been described with reference to the structure disclosed, it is not confined to the details set forth, but is intended to cover such modifications or changes as may come within the scope of the following claims:

I claim:

1. In a raster output scanner for producing images on a movable imaging member in response to image pixels input thereto, said scanner including a high intensity imaging beam, a movable scanning element for scanning said beam across said imaging member, a drive motor for driving said scanning element, modulator means for modulating said beam to selectively expose said imaging member in accordance with image pixels input thereto, and clock means for generating pixel clock pulses for clocking image pixels to said modulator means, the combination comprising:
   (a) sensor means for producing a pulse-like signal representative of the velocity of said imaging member; and
   (b) control means responsive to said signal for adjusting the speed of said drive motor to change the velocity of said scanning element to thereby maintain a predetermined velocity relationship between said imaging member and said scanning element in spite of changes in the velocity of said imaging member during operation of said scanner.

2. The scanner system according to claim 1 in which said sensor means includes at least one timing mark on said imaging member, and means responsive to movement of said timing mark to generate said pulse-like signal, the frequency of said signal being representative of the velocity of said imaging member.

3. The scanner according to claims 1 or 2 including:
   a source of energizing pulses for said drive motor,
   said control means adjusting the frequency of said source in response to the pulse-like signal output of said sensor means to thereby provide energizing pulses to said drive motor at a frequency which maintains said predetermined velocity relationship between said imaging member and said scanning element.

4. The scanner according to claim 1 including second control means for adjusting the frequency of pixel clock pulses output by said clock means in response to changes in the velocity of said scanning element.

5. The scanner according to claim 4 in which the frequency of the pixel clock pulses output by said clock means is adjustable by said second control means through a preset frequency range,
   said first mentioned control means including means to shift said preset frequency range in response to changes in said imaging member velocity.

6. In a method of providing constant image size in a raster output scanner despite changes in velocity of the imaging member on which images are produced, said scanner including a high intensity imaging beam, a movable scan element for scanning said beam across said member, a drive motor for driving said scan element, modulator means for modulating said beam in accordance with image signals input thereto to generate an image representative of said image signals on said member, and clock means for generating clock pulses for clocking image signals to said modulator means, the steps which comprise:

(a) generating a pulse-like signal representative of the velocity of said imaging member; and
(b) adjusting the speed of said drive motor in accordance with said signal to maintain a predetermined velocity relationship between said scan element and said imaging member so that image size remains constant despite changes in the velocity of said imaging member.

7. The method according to claim 6 including the step of:

adjusting the frequency of the clock pulses output by said clock means in response to changes in the velocity of said scan element to maintain the rate at which image signals are clocked to said modulator means synchronized with said scan element.

8. The method according to claim 6 including the steps of:

(a) generating a clock control signal representing the velocity of said scan element;
(b) making limited adjustments to the frequency of the clock pulses output by said clock means to maintain the relationship between the frequency of said clock pulses and the velocity of said scan element constant despite changes in the velocity of said scan element; and
(c) shifting the frequency midpoint about which said clock pulses are adjusted in response to changes in said imaging member velocity.

9. The method according to claim 6 including the steps of:

(a) comparing the velocity of said scan element with said imaging member velocity; and
(b) adjusting the speed of said drive motor to maintain said predetermined velocity relationship between said scan element and said imaging member.

* * * * *